US008740523B2

(12) United States Patent
Nakashima et al.

(10) Patent No.: US 8,740,523 B2
(45) Date of Patent: Jun. 3, 2014

(54) SPINDLE DEVICE

(75) Inventors: Kunimichi Nakashima, Anjo (JP); Yuji Okawa, Kariya (JP); Takamasa Shibata, Kariya (JP); Takahito Umeki, Toyota (JP)

(73) Assignee: JTEKT Corporation, Osaka-shi (JP)

( * ) Notice: Subject to any disclaimer, the term of this patent is extended or adjusted under 35 U.S.C. 154(b) by 992 days.

(21) Appl. No.: 12/836,885

(22) Filed: Jul. 15, 2010

(65) Prior Publication Data

US 2011/0020088 A1 Jan. 27, 2011

(30) Foreign Application Priority Data

Jul. 21, 2009 (JP) ................................ 2009-169754

(51) Int. Cl.
*F16C 35/12* (2006.01)

(52) U.S. Cl.
USPC ............................ 409/231; 409/207; 409/193

(58) Field of Classification Search
USPC ................................ 409/231, 233, 207, 193
See application file for complete search history.

(56) References Cited

U.S. PATENT DOCUMENTS

| | | | | |
|---|---|---|---|---|
| 3,313,581 | A | 4/1967 | Kusakabe | |
| 4,551,032 | A | 11/1985 | Mottershead | |
| 5,388,917 | A * | 2/1995 | Hibi et al. | 384/517 |
| 7,264,430 | B2 * | 9/2007 | Bischof et al. | 409/231 |

FOREIGN PATENT DOCUMENTS

| | | |
|---|---|---|
| DE | 31 43 344 A1 | 5/1983 |
| GB | 1 535 163 | 12/1978 |
| JP | 60-139911 | 7/1985 |
| JP | 10-89355 | 4/1998 |

OTHER PUBLICATIONS

Extended European Search Report Issued Jan. 11, 2013 in patent Application No. 10170090.4.

Notice of Reasons for the Rejection issued Sep. 3, 2013 in Japanese Patent Application No. 2009-169754 (English translation only).

* cited by examiner

*Primary Examiner* — David Bryant
*Assistant Examiner* — Christopher Besler
(74) *Attorney, Agent, or Firm* — Oblon, Spivak, McClelland, Maier & Neustadt, L.L.P.

(57) ABSTRACT

By controlling an amount of preload applied to a rolling bearing that supports a spindle in accordance with the change of state of the spindle in actual machining, the rotation of the spindle is controlled in an optimal state, and the service life of the bearing is extended while the required stiffness of the spindle is ensured. When a corrected preload amount falls outside a range of a preload as a controllable region, the corrected preload amount is corrected so as to fall within the range of the preload. That is, an actually controlled preload is regulated to fall within the preset range of preload. Therefore, it is possible to ensure the stiffness of the rolling bearing or prevent heating and excessive increase in contact pressure of the rolling bearing.

12 Claims, 6 Drawing Sheets

SPINDLE DEVICE

INCORPORATION BY REFERENCE/RELATED APPLICATION

This application claims priority to Japanese Patent Application No. 2009-169754 filed on Jul. 21, 2009 the disclosure of which, including the specification, drawings and abstract, is incorporated herein by reference in its entirety.

BACKGROUND OF THE INVENTION

1. Field of the Invention

The invention relates to a spindle device used for a machine tool, or the like.

2. Discussion of Background

For example, in a spindle device of a machining center, an axial preload is applied to a bearing that supports a spindle in order to maintain the rotational accuracy of the spindle and the stiffness of the spindle. A preload changing system has been suggested as the system for applying a preload. The preload changing system changes a preload in response to the rotation speed of the spindle. For example, Japanese Patent Application Publication No. 60-139911 (JP-A-60-139911) describes a preload changing system. The preload changing system includes driving means for axially pressing an outer ring of a bearing based on the rotation speed of a spindle. Only when the rotation speed of the spindle exceeds a predetermined value, the preload changing system uses the driving means to press the outer ring of the bearing to thereby displace the outer ring. Thus, a difference in dimension between inner and outer spacers is reduced. Thus, a preload applied to the bearing is reduced.

In the preload changing system described in JP-A-60-139911, a preload is merely reduced in a stepwise manner with an increase in the rotation speed of the spindle, and the type of machining and the state of machining by a tool attached to the spindle are not taken into account at all.

SUMMARY OF INVENTION

The invention provides a spindle device that is able to extend the service life of a bearing while ensuring the required stiffness by applying an optimal preload according to the type of machining and the state of machining by a tool attached to a spindle.

According to a feature of an example of the invention, by controlling an amount of preload that is applied to a rolling bearing that supports a spindle in accordance with a change of state of the spindle in actual machining, rotation of the spindle is controlled in an optimal state. Thus, it is possible to extend the service life of the rolling bearing while ensuring the required stiffness of the spindle.

According to another feature of an example of the invention, the change of state of the spindle is variously measured. Therefore, by controlling a preload amount in accordance with the change of state, the rotation of the spindle may be controlled in a further optimal state.

According to a further feature of an example of the invention, when a preload is applied to the rolling bearing at an initial value of a preload amount obtained from machining information, the initial value of the preload amount is corrected in accordance with the change of state of the spindle in actual machining, and the preload amount is controlled to the corrected preload amount. Thus, the rotation of the spindle is controlled in an optimal state to thereby make it possible to achieve highly accurate machining.

According to another feature of the invention, when the corrected preload amount falls out of range of a preload as a controllable region, the corrected preload amount is corrected so as to fall within the range of the preload. That is, an actually controlled preload is regulated to fall within a preset range of a preload. Therefore, it is possible to ensure the stiffness of the rolling bearing or prevent heating and excessive increase in contact pressure of the rolling bearing.

According to another feature of the invention, when the corrected preload amount falls below a minimum preload of the range of the preload as the controllable region, the corrected preload amount is corrected so as to fall within the range of the preload. That is, an actually controlled preload is regulated to fall within a preset range of a preload. Therefore, it is possible to ensure the stiffness of the rolling bearing or prevent heating and excessive increase in contact pressure of the rolling bearing. In addition, when the corrected preload amount exceeds a maximum preload of the range of the preload as the controllable region, the rotation of the spindle is, for example, stopped. Therefore, it is possible to protect the spindle, that is, prevent a seizure, or the like, of the spindle.

According to further feature of the invention, a preset increase rate or a preset decrease rate is used to correct a current preload amount. Therefore, it is possible to generate a preload command value that can give a maximum effect in a short period of time. Then, the increase rate or the decrease rate is changed depending a type of the cutting tool. Therefore, it is possible to improve the machining accuracy of respective portions of a workpiece machined by different cutting tools.

According to another feature of the invention, the maximum preload is a preload at which the rolling bearing is able to normally support the spindle, and the minimum preload is a preload at which the spindle is able to normally rotate. By controlling a preload within a range between the maximum preload and the minimum preload, it is possible to extend the service life of the bearing while stabilizing the rotation of the spindle.

According to further feature of the invention, the spindle device includes a front rolling bearing and a rear rolling bearing. Therefore, by controlling an amount of preload that is applied to at least one of the bearings, the rotation of the spindle may be controlled in an optimal state to thereby make it possible to achieve highly accurate machining.

According to another feature of the invention, the spindle device includes a front rolling bearing and a rear rolling bearing. Therefore, by executing control in such a manner that preload amounts applied to the respective bearings are different from each other, a selectable spindle characteristic range further expands. Therefore, it is possible to attain a spindle characteristic further suitable for various types of machining.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

Figures 1A, 1B:
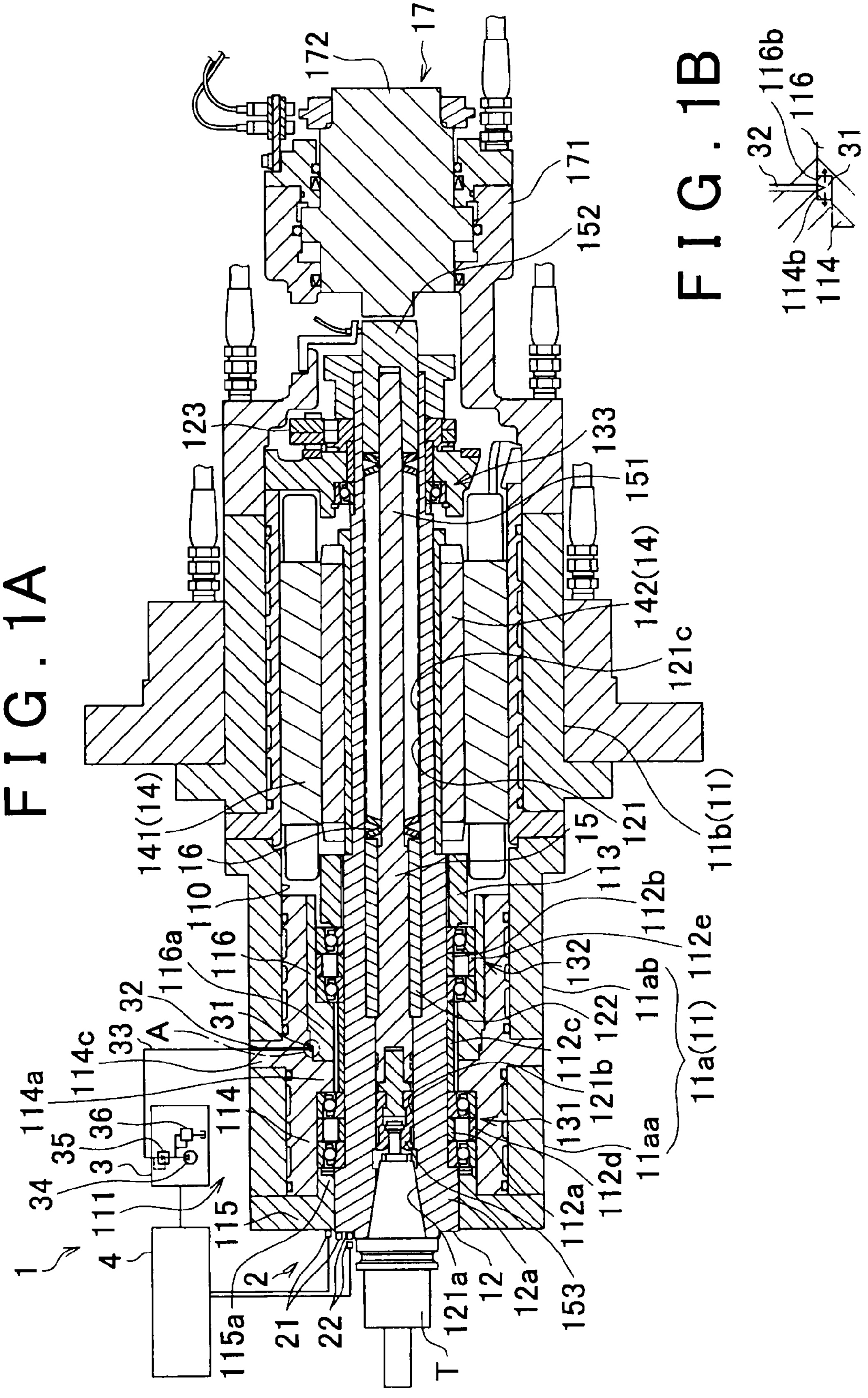
FIG. 1A is a longitudinal sectional view that shows the overall structure of a spindle device according to an embodiment of the invention.
FIG. 1B is an enlarged sectional view of the portion A shown in FIG. 1A.
Figure 2:
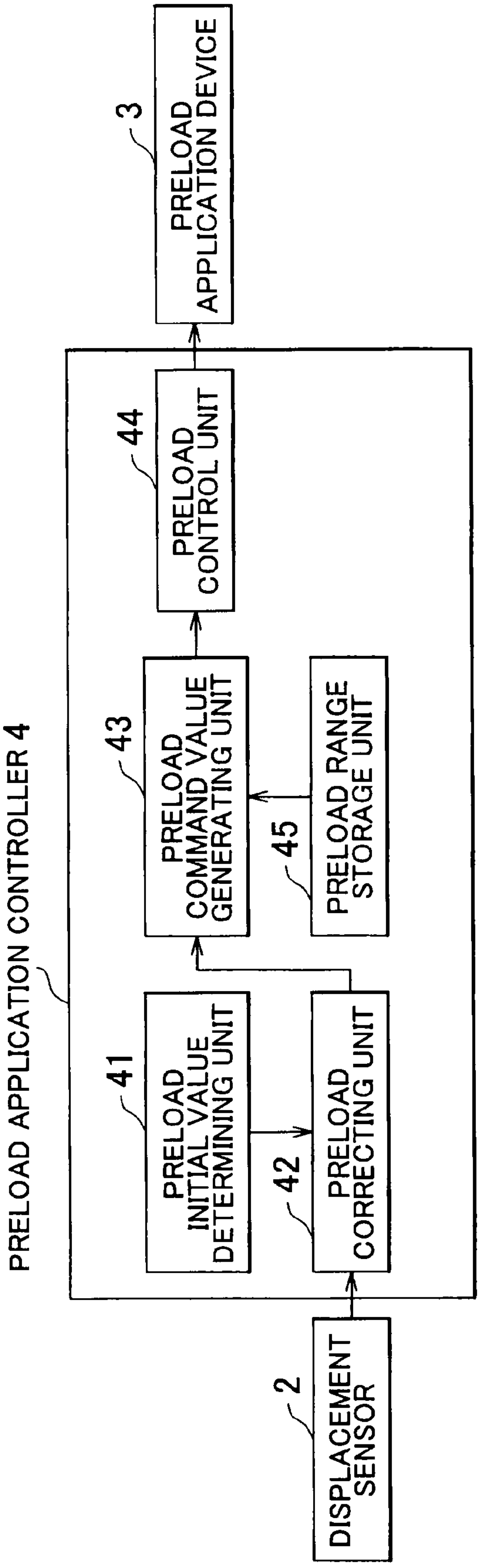
FIG. 2 is a block diagram of a preload application controller of the spindle device shown in FIG. 1A.

FIG. 1A is a longitudinal sectional view that shows the overall structure of a spindle device according to an embodiment of the invention. FIG. 1B is an enlarged sectional view of the portion A shown in FIG. 1A. FIG. 2 is a block diagram of a preload application controller of the spindle device shown in FIG. 1A. Note that, in FIG. 1A, the horizontal direction is an axial direction, and the left side is defined as a front side. As shown in FIG. 1A, the spindle device 1 according to the present embodiment includes a substantially cylindrical spindle housing 11, a spindle 12, a pair of first front rolling bearings 131, a pair of second front rolling bearings 132 and a rear rolling bearing 133. The spindle housing 11 has an accommodating space 110 inside its inner peripheral portion. The spindle 12 is arranged in the accommodating space 110. The pair of first front rolling bearings 131 and the pair of second front rolling bearings 132 support the front portion of the spindle 12. The rear rolling bearing 133 supports the rear portion of the spindle 12. Furthermore, the spindle device 1 includes a displacement sensor 2, a preload application device 3 (that corresponds to "preload application means" according to the invention) and a preload application controller 4 (that corresponds to "preload application control means" according to the invention). The displacement sensor 2 serves as spindle state measurement means for measuring the change of state of the spindle 12 caused due to machining carried out with the use of a cutting tool T. The preload application device 3 applies an axial preload to the pair of first front rolling bearings 131 and the pair of second front rolling bearings 132. The preload application controller 4 controls an amount of preload that is applied to the pair of first front rolling bearings 131 and the pair of second front rolling bearings 132 by the preload application device 3 on the basis of the spindle state measured by the displacement sensor 2.

A rod hole 121 is formed at the rotation axis center of the spindle 12. The rod hole 121 extends in the axial direction. The rod hole 121 passes through the spindle 12 in the axial direction. The rod hole 121 has a tool hold taper portion 121*a* at its front end. A collet accommodating portion 121*b* is formed behind the tool hold taper portion 121*a*. A spring accommodating hole 121*c* having a diameter larger than that of the collet accommodating portion 121*b* is formed behind the collet accommodating portion 121*b*. A sleeve 122 is fixed to the front end portion of the spring accommodating hole 121*c*. A rod 15 is accommodated in the rod hole 121 so as to be movable in the axial direction. A stopper 152 having a diameter larger than that of a long shaft member 151 is secured to the rear end portion of the shaft member 151 of the rod 15. Furthermore, a collet 153 is attached to the front end of the rod 15. The collet 153 is radially expandable and contractible, and is formed to be able to hold a cutting tool T.

In a state where the rod 15 is accommodated in the rod hole 121, the front end portion of the shaft member 151 is slidable over the inner peripheral surface of the sleeve 122, and the stopper 152 is slidable in the spring accommodating hole 121*c*. In addition, a plurality of belleville springs 16 are interposed between the rear end portion of the sleeve 122 and the front end surface of the stopper 152 inside the spring accommodating hole 121*c*. The rod 15 is constantly urged rearward with respect to the spindle 12. A hydraulic cylinder 17 is provided behind the spindle 12. The hydraulic cylinder 17 includes a cylinder housing 171 and a piston 172. The cylinder housing 171 is integrated with the spindle housing 11. The piston 172 is provided in the cylinder housing 171 so as to be axially movable. As the piston 172 moves rearward to release engagement between the piston 172 and the rod 15, the rod 15 holding the cutting tool T with the collet 153 recedes with respect to the spindle 12 by the urging force of the belleville springs 16. Then, the cutting tool T is fixed to the spindle 12 in such a manner that the cutting tool T is fitted into the tool hold taper portion 121*a* of the spindle 12. As the piston 172 moves frontward to be engaged with the rod 15, the rod 15 holding the cutting tool T advances with respect to the spindle 12 against the urging force of the belleville springs 16. Then, the collet 153 radially expands to release the cutting tool T.

The displacement sensor 2 is formed of a radial displacement sensor 21 and an axial displacement sensor 22. The radial displacement sensor 21 detects the radial displacement of the spindle 12. The axial displacement sensor 22 detects the axial displacement of the spindle 12. The displacement sensor 2 computes and obtains a load acting on the spindle 12 on the basis of the detected values of these displacement sensors 21 and 22 and the specifications, such as stiffness, of the spindle 12. Note that a sensor that directly measures a load, such as a force sensor, may be used instead of the displacement sensor 2. In addition, as the spindle state measurement means for measuring the change of state of the spindle 12 caused due to machining carried out with the use of the cutting tool T, not only detecting a load acting on the spindle 12 with the use of the displacement sensors 21 and 22 but also detecting the vibrations of the spindle 12 with the use of a vibration sensor or detecting sound generated through machining carried out by the cutting tool T with the use of an acoustic sensor may be employed.

The first and second front rolling bearings 131 and 132 are angular contact bearings, and are arranged side by side in the axial direction at the front side in the accommodating space 110 of the front spindle housing 11*a*. The rear rolling bearing 133 is a cylindrical roller bearing, and is arranged at the rear side in the accommodating space 110. The first and second front rolling bearings 131, 132 support the front side portion, adjacent to the cutting tool T, of the spindle 12. The rear rolling bearing 133 supports the rear side portion that is behind the front side portion of the spindle 12 with respect to the cutting tool T. Cylindrical spacers 112*a*, 112*b* and 112*c* are respectively arranged between the inner rings of the pair of first front rolling bearings 131, between the inner rings of the pair of second front rolling bearings 132 and between the inner ring of the first front rolling bearing 131 and the inner ring of the second front rolling bearing 132. The outer peripheral surface of the spindle 12 is fitted to the inner peripheral portions of the first front rolling bearings 131, second front rolling bearings 132 and spacers 112*a*, 112*b* and 112*c*. Then, the inner ring of the frontmost first front rolling bearing 131 is in contact with a flange portion 12*a* formed at the front end of the spindle 12. A cylindrical inner ring retainer 113 is in contact with the inner ring of the rearmost second front rolling bearing 132. The inner ring retainer 113 is screwed onto the outer peripheral surface of the spindle 12. Thus, the first front rolling bearings 131, the second front rolling bearings 132 and the spacers 112*a*, 112*b* and 112*c* are fixed to the outer peripheral surface of the spindle 12.

Cylindrical spacers 112*d* and 112*e* are respectively arranged between the outer rings of the pair of first front rolling bearings 131 and between the outer rings of the pair of second front rolling bearings 132. The first front rolling bearings 131, the second front rolling bearings 132 and the spacers 112*d* and 112*e* are supported by a bearing support cylinder 111. The bearing support cylinder 111 is formed of a substantially cylindrical sleeve 114, a substantially annular outer ring retainer 115 and a substantially cylindrical piston 116.

A circumferential protrusion 114*a* is formed at a substantially center of the inner peripheral portion of the sleeve 114. The circumferential protrusion 114*a* protrudes inward. A flange portion 114*c* is formed at a substantially center of the outer peripheral portion of the sleeve 114. The flange portion 114*c* protrudes outward. The inside diameter of the inner peripheral portion of the sleeve 114, which is in front of the circumferential protrusion 114*a*, is substantially equal to the outside diameter of each first front rolling bearing 131 and the outside diameter of the spacer 112*d*. The inside diameter of the inner peripheral portion of the sleeve 114, which is behind the circumferential protrusion 114*a*, is substantially equal to the outside diameter of the piston 116. The outside diameter of the outer peripheral portion of the sleeve 114, which is in front of the flange portion 114*c*, is substantially equal to the inside diameter of one of the two-piece front spindle housings 11*a* (first front spindle housing 11*aa*). The outside diameter of the outer peripheral portion of the sleeve 114, which is behind the flange portion 114*c*, is substantially equal to the inside diameter of the other one of the two-piece front spindle housings 11*a* (second front spindle housing 11*ab*).

A boss portion 115*a* is formed on one end surface of the outer ring retainer 115. The boss portion 115*a* axially protrudes from the end surface. The outside diameter of the boss portion 115*a* of the outer ring retainer 115 is substantially equal to the inside diameter of the inner peripheral portion of the sleeve 114, which is in front of the circumferential protrusion 114*a* (outside diameter of each first front rolling bearing 131 and the outside diameter of the spacer 112*d*). The outside diameter of the outer ring retainer 115 is substantially equal to the outside diameter of the first front spindle housing 11*aa*. A circumferential protrusion 116*a* is formed on the inner peripheral portion of the front side portion of the piston 116. The circumferential protrusion 116*a* protrudes inward. The inside diameter of the inner peripheral portion of the piston 116, which is behind the circumferential protrusion 116*a*, is substantially equal to the outside diameter of each second front rolling bearing 132 and the outside diameter of the spacer 112*e*.

Then, the first front rolling bearings 131 and the spacer 112*d* are fitted to the inner peripheral portion of the sleeve 114, which is in front of the circumferential protrusion 114*a*. The second front rolling bearings 132 and the spacer 112*e* are fitted to the inner peripheral portion of the piston 116, which is behind the circumferential protrusion 116*a*. Then, the outer peripheral surface of the piston 116 is fluid-tightly fitted to the inner peripheral portion of the sleeve 114, which is behind the circumferential protrusion 114*a*. The first front spindle housing 11*aa* is fitted to the outer peripheral portion of the sleeve 114, which is in front of the flange portion 114*c*. The second front spindle housing 11*ab* is fitted to the outer peripheral portion of the sleeve 114, which is behind the flange portion 114*c*.

In this way, the outer ring of the first front rolling bearing 131 located at the front side is in contact with the boss portion 115*a* of the outer ring retainer 115, and the outer ring of the first front rolling bearing 131 located at the rear side is in contact with the circumferential protrusion 114*a* of the sleeve 114. The outer ring of the second front rolling bearing 132 located at the front side is in contact with the circumferential protrusion 116*a* of the piston 116. The outer ring of the second front rolling bearing 132 located at the rear side is in free condition. Then, the sleeve 114, the first front spindle housing 11*aa*, the second front spindle housing 11*ab* and the outer ring retainer 115 are integrally fastened to one another by bolts (not shown) that are extended through from the front end surface of the outer ring retainer 115. The second front spindle housing 11*ab* is integrally fastened to the rear spindle housing 11*b* by bolts (not shown). The rear spindle housing 11*b* accommodates a built-in motor 14.

As shown in the enlarged sectional view of the portion A in FIG. 1B, a step 116*b* formed by a small-diameter portion and a large-diameter portion is formed in the outer peripheral surface of the front side portion of the piston 116, and a step 114*b* is formed in the inner peripheral surface of the sleeve 114, which is behind the circumferential protrusion 114*a*. The step 114*b* is formed by a small-diameter portion and a large-diameter portion. The small-diameter portion and large-diameter portion of the piston 116 may be respectively fitted to the large-diameter portion and small-diameter portion of the sleeve 114. Then, an annular hydraulic cylinder 31 is formed between the steps 116*b* and 114*b*. An oil passage 32 is in fluid communication with the hydraulic cylinder 31. The oil passage 32 is perforated from the outer peripheral surface of the flange portion 114*c* formed at the substantially center of the outer peripheral side of the sleeve 114. A conduit 33 connected to the preload application device 3 is connected to the oil passage 32.

The preload application device 3 is formed of a hydraulic pump 34, a pressure reducing valve 35 and a pressure relief valve 36. The preload application device 3 is controlled by the preload amount control means 40 to supply the hydraulic cylinder 31 with hydraulic pressure corresponding to the rotation speed of the spindle 12, or the like. That is, the maximum hydraulic pressure applied from the hydraulic pump 34 is controlled by the pressure relief valve 36, and then a selected hydraulic pressure within the range up to the maximum hydraulic pressure is controlled by the pressure reducing valve 35 and supplied to the hydraulic cylinder 31 via the conduit 33 and the oil passage 32. Thus, hydraulic pressure in the axial direction (forward or rearward) is generated in the hydraulic cylinder 31, and the piston 116 is pressed rearward to press the outer ring of one of the second front rolling bearings 132. Therefore, a preload is applied to the second front rolling bearings 132. In addition, the spindle 12 moves rearward to press the inner ring of one of the first front rolling bearings 131, so a preload is also applied to the first front rolling bearings 131.

A stator 141 of the built-in motor 14 is secured to the inner peripheral surface of the spindle housing 11. A rotor 142 formed on the outer peripheral surface of the spindle 12 is located on the radially inner side of the stator 141 so as to face the stator 141. As electric power is supplied to the built-in motor 14 formed of the stator 141 and the rotor 142, the spindle 12 rotates together with the rotor 142. The spindle device 1 rotates the spindle 12 in a state where the cutting tool T is attached to the distal end of the spindle 12 to thereby machine a workpiece (not shown). The rotation speed of the spindle 12 is detected by a noncontact speed sensor 123 arranged at the rear side portion of the spindle 12.

As shown in FIG. 2, the preload application controller 4 includes a preload initial value determining unit 41 (that corresponds to "preload initial value determining means" according to the invention), a preload correcting unit 42 (that corresponds to "preload correcting means" according to the invention), a preload command value generating unit 43 (that corresponds to "preload command value generating means" according to the invention) and a preload control unit 44 (that corresponds to "preload control means" according to the invention). The preload initial value determining unit 41 determines an initial value of an amount of preload that is applied to the first and second front rolling bearings 131 and 132 by the preload application device 3 on the basis of the number of revolutions of the spindle 12, or the like. The preload correcting unit 42 corrects the initial value of a preload amount received from the preload initial value determining unit 41 in accordance with the load measured by the displacement sensor 2 to thereby obtain a corrected preload amount. The preload command value generating unit 43 corrects the corrected preload amount, received from the preload correcting unit 42 in such a manner that the corrected preload amount falls within the range of an applied preload read from a preload range storage unit 45 (that corresponds to "preload range storage means" according to the invention) to thereby generate a preload command value. The preload control unit 44 controls the preload application device 3 on the basis of the preload command value from the preload command value generating unit 43.

The preload initial value determining unit 41 determines the initial value of a preload amount on the basis of one or a combination of any two or more of the number of revolutions of the spindle 12, the tool information of the cutting tool T used, the type of a workpiece machined by the cutting tool T, a machining condition, and the like, as an optimal preload amount for these various conditions. The number of revolutions of the spindle 12, the tool information of the cutting tool T used, the type of a workpiece, a machining condition, and the like, are manually input with the use of a keyboard, or the like, or are directly or indirectly recorded in an NC program, and then the preload initial value determining unit 41 computes the initial value of a preload amount on the basis of these pieces of information. Note that it is also applicable that the initial value of an optimal preload amount is obtained in advance, and the initial value of the preload is directly input with the use of a keyboard, or the like, or indirectly input through an NC program, or the like. In addition, a preload is applied to the first and second front rolling bearings 131 and 132 at the initial value of the preload amount by the preload application device 3, and, when machining is carried out by the cutting tool T, an appropriate value of a load applied to the spindle 12 is also input in the preload application controller 4 together with the initial value of the preload amount. The preload correcting unit 42 compares a load that is actually acting on the spindle 12 and that is obtained from the displacement sensor 2 with a predetermined appropriate load preset for the initial value of a preload amount, and corrects the initial value of the preload amount received from the preload initial value determining unit 41 to obtain a corrected preload amount where necessary depending on the compared result.

For example, when a load acting on the spindle 12 is larger than the predetermined load, the preload correcting unit 42 corrects the preload amount in such a manner that the preload amount increases at a preset increase rate; whereas, when a load acting on the spindle 12 is smaller than the predetermined load, the preload correcting unit 42 corrects the preload amount in such a manner that the preload amount decreases at a preset decrease rate. The initial value of a preload amount is set to an optimal preload amount on the basis of the number of revolutions of the spindle 12, the tool information of the cutting tool T used, the type of a workpiece machined by the cutting tool T, a machining condition, and the like. However, for example, when the sharpness of the cutting tool T is decreased or a stock removal changes because of variations of the dimensional accuracy of a material shape and therefore the state of the spindle 12 is changed, the initial value of a preload amount does not always coincide with an optimal preload amount. Then, these changes of state of the spindle 12, for example, a change in load acting on the spindle 12, are detected, and then the initial value of a preload amount is corrected so as to become an optimal preload amount in response to a change in load. The changes of state of the spindle 12 are detected not only by measuring a load acting on the spindle 12 but also by measuring vibrations of the spindle 12 or sound generated through machining by the cutting tool T. A preload amount is, for example, corrected by increasing a decrease rate (increase rate) in a milling tool having a relatively large machining load and by reducing a decrease rate (increase rate) in a ball end mill having a relatively small machining load. In addition, even in tools of the same type, a preload amount is corrected by increasing a decrease rate (increase rate) for a tool having a large diameter and by reducing a decrease rate (increase rate) for a tool having a small diameter.

Figure 3:
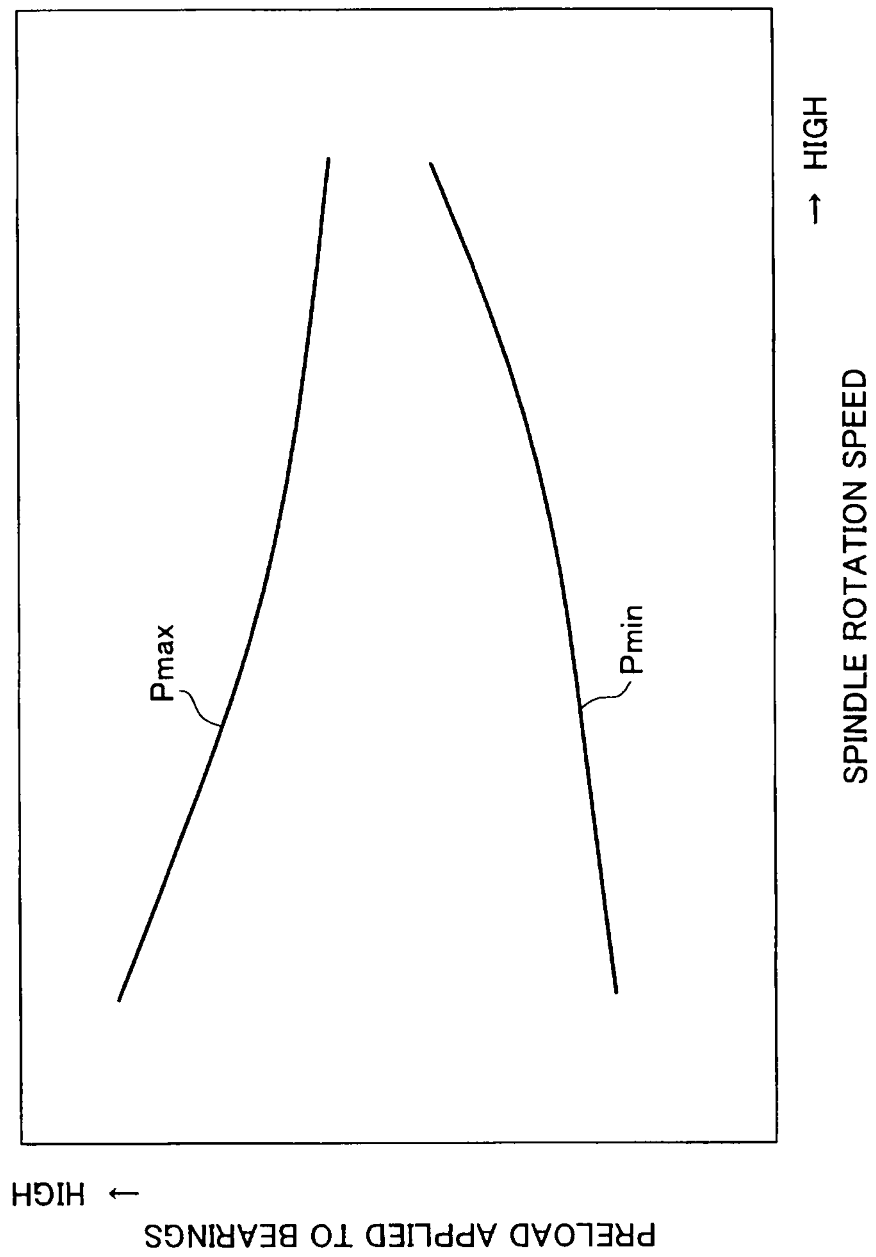
FIG. 3 is a graph that sets a maximum preload at which the bearing is able to normally support a spindle and a minimum preload at which the spindle is able to normally rotate for each rotation speed of the spindle.

As shown in FIG. 3, the preload range storage unit 45 prestores a table in which a maximum preload Pmax at which the first and second front rolling bearings 131 and 132 are able to normally support the spindle 12 and a minimum preload Pmin at which the spindle 12 is able to normally rotate are set for each rotation speed of the spindle 12, and a region between the maximum preload Pmax and the minimum preload Pmin is set as a controllable region of the preload application device 3. The maximum preload Pmax decreases as the rotation speed of the spindle 12 increases. The minimum preload Pmin increases as the rotation speed of the spindle 12 increases. An optimal preload varies depending on the rotation speed of the spindle 12. Therefore, by varying a preload range as a controllable region on the basis of the rotation speed of the spindle 12, it is possible to apply a preload appropriate for the rotation speed of the spindle 12 to the bearings.

The maximum preload Pmax set for each rotation speed of the spindle 12 is a limit value at which the stiffness of the first and second front rolling bearings 131 and 132 may be ensured and the stiffness of the spindle 12 may be maximally increased. The minimum preload Pmin set for each rotation speed of the spindle 12 is a limit value at which heating and excessive increase in contact pressure of the first and second front rolling bearings 131 and 132 are prevented to make it possible to maximally extend the service life of the first and second front rolling bearings 131 and 132. Thus, the preload application controller 4 controls the preload application device 3 to apply a preload within the range from the minimum preload Pmin to the maximum preload Pmax to the first and second front rolling bearings 131 and 132. The preload is determined on the basis of the degree of demand for the stiffness of the spindle 12 and extension of the service life of the first and second front rolling bearings 131 and 132. Thus, it is possible to control the rotation of the spindle 12 in an optimal state.

When the corrected preload amount received from the preload correcting unit 42 falls out of the preload range as the controllable region read from the preload range storage unit 45, the preload command value generating unit 43 corrects the corrected preload amount in such a manner that the corrected preload amount falls within the preload range to generate a preload command value. The preload control unit 44 controls the preload application device 3 in such a manner that a preload applied to the first and second front rolling bearings 131 and 132 coincides with the preload command value received from the preload command value generating unit 43. Thus, a preload that is actually controlled by the preload control unit 44 is regulated to fall within the preset preload range. Therefore, it is possible to ensure the stiffness of the first and second front rolling bearings 131 and 132 or prevent heating and excessive increase in contact pressure of the first and second front rolling bearings 131 and 132.

In the thus configured spindle device 1, the operation of the preload application controller 4 will be described with reference to the flowchart shown in FIG. 4. First, an initial value of an amount of preload that is applied to the first and second front rolling bearings 131 and 132 by the preload application device 3 is determined on the basis of one or a combination of any two or more of the number of revolutions of the spindle 12, the tool information of the cutting tool T used, the type of a workpiece and a machining condition (step 1). The preload application device 3 is controlled in accordance with the determined initial value of the preload amount to apply an axial preload to the first and second front rolling bearings 131 and 132 (step 2). When it is determined on the basis of a signal from the pressure reducing valve 35 that the preload applied to the first and second front rolling bearings 131 and 132 has reached the initial value of the preload amount (step 3), a built-in motor 14 is controlled in accordance with an instructed rotation speed command value to thereby rotate the spindle 12 (step 4). When it is determined on the basis of a measured signal from the speed sensor 123 that the rotation speed of the spindle 12 has reached the rotation speed command value (step 5), a load acting on the spindle 12 during rotation of the spindle 12 is measured through a detected signal from the displacement sensor 2 (step 6), and then it is determined which is the larger one, the measured load or the predetermined load through comparison (step 7).

When the measured load is smaller than the predetermined load, a corrected preload amount is obtained by reducing the preload amount at a predetermined decrease rate (step 8). Here, the decrease rate is, for example, set to a value within the range from several percent to several tens of percent depending on, for example, the type of a cutting tool. Note that the degree of decrease may be set in the form of an absolute value instead of in the form of a decrease rate. Thus, it is possible to correct a preload amount to a corrected preload amount that can give a maximum effect in a short period of time. Then, it is determined whether the corrected preload amount is larger than or equal to the minimum preload Pmin by referring to the preload range table (step 9).

When the corrected preload amount is larger than or equal to the minimum preload Pmin, the process proceeds to step 14, and then the preload application device 3 is controlled to change the axial preload amount, which will be applied to the first and second front rolling bearings 131 and 132, to the corrected preload amount. Then, when it is determined on the basis of a signal from the pressure reducing valve 35 that the preload applied to the first and second front rolling bearings 131 and 132 has reached the corrected preload amount (step 15), the process returns to step 6, and then a load acting on the spindle 12 is measured again through a detected signal from the displacement sensor 2, after which the process proceeds to step 7. On the other hand, in step 9, when the corrected preload amount is smaller than the minimum preload Pmin, the process proceeds to step 10 and the corrected preload amount is set to the minimum preload Pmin, and then the process proceeds to step 14 to execute the above described process. Note that it is also applicable that, in step 9, when the corrected preload amount is smaller than the minimum preload Pmin, the process returns to step 6 and the above described process is executed while keeping the corrected preload amount immediately before the corrected preload amount falls below the minimum preload Pmin instead of changing the corrected preload amount.

On the other hand, in step 7, when the measured load is larger than the predetermined load, a corrected preload amount is obtained by increasing the preload amount at the predetermined increase rate (step 11). Here, the increase rate is, for example, set to a value within the range from several percent to several tens of percent depending on the type of a cutting tool. Note that the degree of increase may be set in the form of an absolute value instead of in the form of an increase rate. Thus, it is possible to correct a preload amount to a corrected preload amount that can give a maximum effect in a short period of time. Then, it is determined whether the corrected preload amount is smaller than or equal to the maximum preload Pmax by referring to the preload range table (step 12).

When the corrected preload amount is smaller than or equal to the maximum preload Pmax, the process proceeds to step 14, and then the preload application device 6 is controlled to change the axial preload amount, which will be applied to the first and second front rolling bearings 131 and 132, to the corrected preload amount. Then, when it is determined on the basis of a signal from the pressure reducing valve 35 that the preload applied to the first and second front rolling bearings 131 and 132 has reached the corrected preload amount (step 15), the process returns to step 6, and then a load acting on the spindle 12 is measured again through a detected signal from the displacement sensor 2, after which the process proceeds to step 7. On the other hand, in step 12, when the corrected preload amount is larger than the maximum preload Pmax, the process proceeds to step 13 and the corrected preload amount is set to the maximum preload Pmax, and then the process proceeds to step 14 to execute the above described process. Note that it is also applicable that, in step 12, when the corrected preload amount is larger than the maximum preload Pmax, the process returns to step 6 and the above described process is executed while keeping the corrected preload amount immediately before the corrected preload amount exceeds the maximum preload Pmax instead of changing the corrected preload amount.

On the other hand, in step 7, when the measured load is substantially equal to the predetermined load and is appropriate, it is determined whether the rotation speed of the spindle 12 is changed (step 16). When the rotation speed of the spindle 12 is not changed, the minimum preload Pmin and the maximum preload Pmax also do not change, and the preload amount falls within the region between the minimum preload Pmin and the maximum preload Pmax. Therefore, the process returns to step 6 to execute the above described process. On the other hand, in step 16, for example, when a spindle override function is used during machining process and then the rotation speed of the spindle 12 is changed, the minimum preload Pmin and the maximum preload Pmax also change. Therefore, it is determined whether the preload amount is larger than or equal to the minimum preload Pmin by referring to the preload range table (step 17). When the preload amount is larger than or equal to the minimum preload Pmin, it is further determined whether the preload amount is smaller than or equal to the maximum preload Pmax (step 18). When the preload amount is smaller than or equal to the maximum preload Pmax, the preload amount falls within the preload range of the controllable region (region between the maximum preload Pmax and the minimum preload Pmin) of the preload application device 3. Therefore, the process returns to step 6 to execute the above described process.

On the other hand, in step 17, when the preload amount is smaller than the minimum preload Pmin, the process proceeds to step 10 to set the preload amount to the minimum preload Pmin, and then the process proceeds to step 14 to execute the above described process. On the other hand, in step 18, when the preload amount is larger than the maximum preload Pmax, the process proceeds to step 13 and the preload amount is set to the maximum preload Pmax, and then the process proceeds to step 14 to execute the above described process. Note that when one machining process ends and another machining process is carried out, a machining condition including the rotation speed of the spindle changes. In this case, the process returns to step 1 to reset an initial preload amount.

Figure 5:
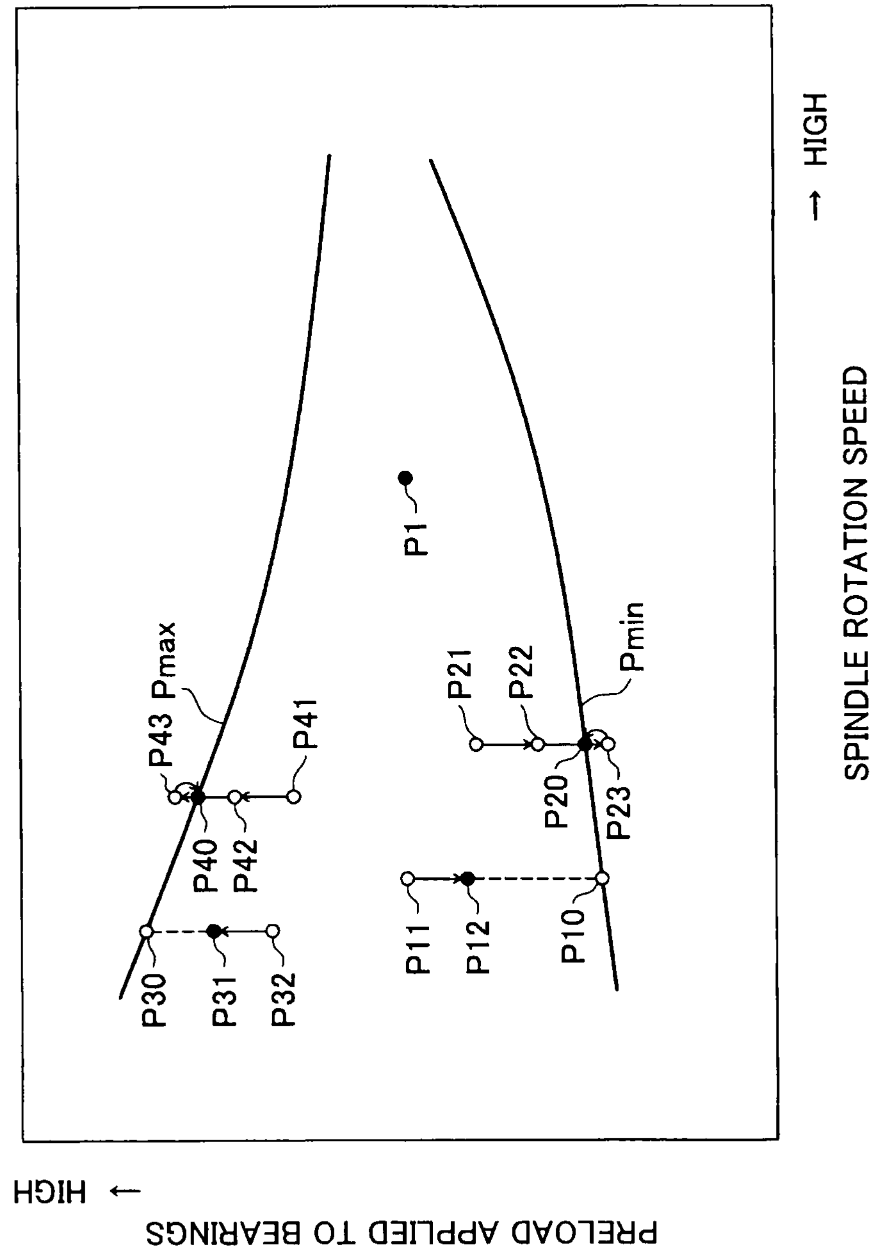
FIG. 5 is a graph that shows an example of generating a preload command value in the preload application controller shown in FIG. 2.

The above described steps will be simply described with reference to FIG. 5. When a measured load at the time of applying a preload in accordance with a preload amount P11 is smaller than a predetermined load preset for the preload amount P11 (step 7), the preload amount P11 is corrected at a preset decrease rate to a corrected preload amount P12 (step 8). Then, when the corrected preload amount P12 is larger than or equal to a minimum preload P10 (step 9), an axial preload is applied to the first and second front rolling bearings 131 and 132 at the corrected preload amount P12 (steps 14 and 15). Then, when the measured load at the time of applying the preload is substantially equal to the above predetermined load (step 7), the spindle 12 is controlled for rotation in the preloaded state.

In addition, when a measured load at the time of applying a preload in accordance with a preload amount P21 is smaller than a predetermined load preset for the preload amount P21 (step 7), the preload amount P21 is corrected at a preset decrease rate to a corrected preload amount P22 (step 8). Then, when the corrected preload amount P22 is larger than or equal to a minimum preload P20 (step 9), an axial preload is applied to the first and second front rolling bearings 131 and 132 at the corrected preload amount P22 (steps 14 and 15). Furthermore, when the measured load at the time of applying the preload is smaller than the above predetermined load (step 7), the corrected preload amount P22 is corrected again at a preset decrease rate to a corrected preload amount P23 (step 8). However, when the corrected preload amount P23 falls below the minimum preload P20 (step 9), the corrected preload amount P22 is set to the minimum preload P20 (step 10), and then the spindle 12 is controlled for rotation in the preloaded state.

In addition, when the measured load at the time of applying a preload in accordance with a preload amount P31 is larger than a predetermined load preset for the preload amount P31 (step 7), the preload amount P31 is corrected at a preset increase rate to a corrected preload amount P32 (step 11). Then, when the corrected preload amount P32 is smaller than or equal to a maximum preload P30 (step 12), an axial preload is applied to the first and second front rolling bearings 131 and 132 at the corrected preload amount P32 (steps 14 and 15). Then, when the measured load at the time of applying the preload is substantially equal to the above predetermined load (step 7), the spindle 12 is controlled for rotation in the preloaded state.

In addition, when the measured load at the time of applying a preload in accordance with a preload amount P41 is larger than a predetermined load preset for the preload amount P41 (step 7), the preload amount P41 is corrected at a preset increase rate to a corrected preload amount P42 (step 11). Then, when the corrected preload amount P42 is smaller than or equal to a maximum preload P40 (step 12), an axial preload is applied to the first and second front rolling bearings 131 and 132 at the corrected preload amount P42 (steps 14 and 15). Furthermore, when the measured load at the time of applying the preload is larger than the above predetermined load (step 7), the corrected preload amount P42 is corrected again at a preset increase rate to a corrected preload amount P43 (step 11). However, when the corrected preload amount P43 exceeds the maximum preload P40 (step 12), the corrected preload amount P43 is set to the maximum preload P40 (step 13) and then the spindle 12 is controlled for rotation in the preloaded state. In addition, when the measured load at the time of applying a preload in accordance with a preload amount P1 is substantially equal to a predetermined load preset for the preload amount P1 (step 7) and the preload amount P1 falls within the preload range (steps 17 and 18), the spindle 12 is controlled for rotation in the preloaded state.

Figure 4:
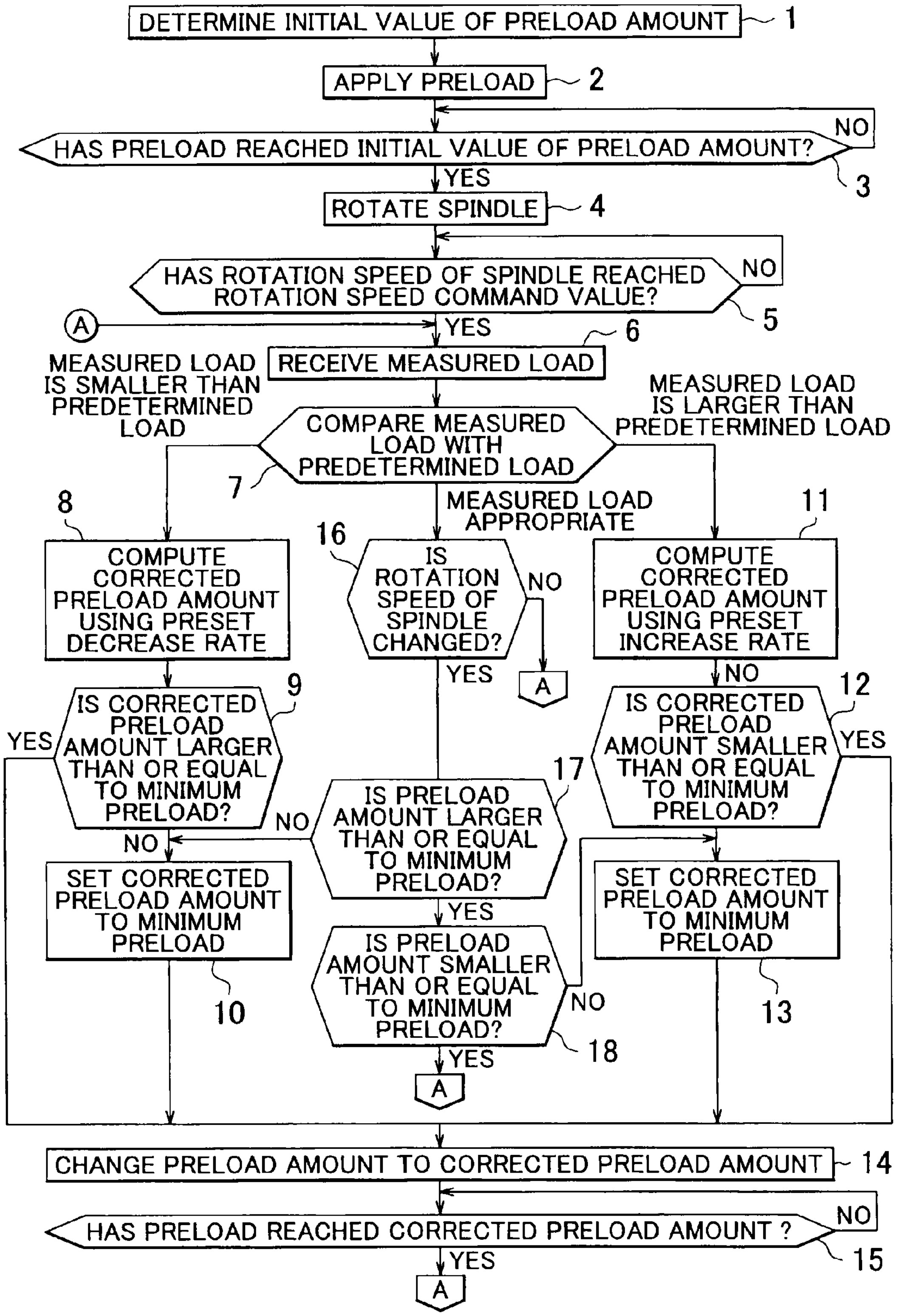
FIG. 4 is a flowchart that illustrates the operation of the preload application controller shown in FIG. 2.

Here, in step 12 of FIG. 4, it is determined whether the corrected preload amount is larger than the maximum preload Pmax, and, when the corrected preload amount is larger than the maximum preload Pmax, the process proceeds to step 13 to set the corrected preload amount to the maximum preload Pmax, and then the process proceeds to step 14 to execute the above described process. However, when the corrected preload amount is larger than the maximum preload Pmax, a load is excessive and it is difficult to further increase the preload. Therefore, it is applicable that, for example, an abnormality alarm is issued to stop the rotation of the spindle 12 or decrease the number of revolutions of the spindle 12 to thereby protect the spindle 12, that is, prevent a seizure, or the like, of the spindle 12.

Figure 6:
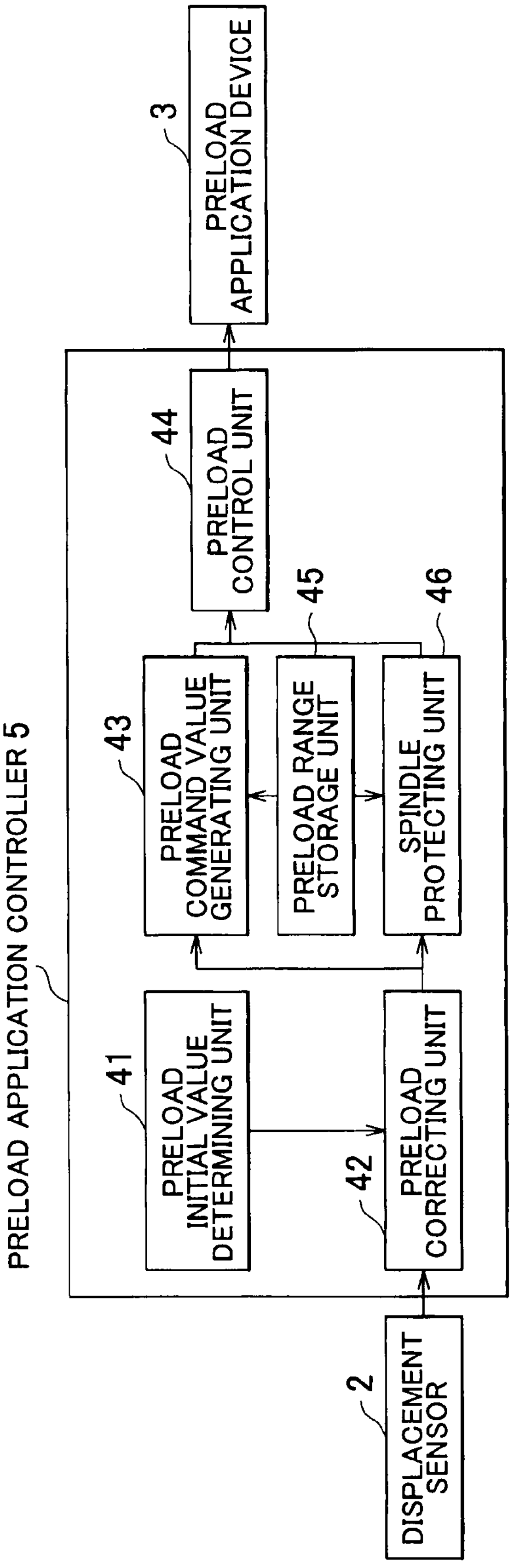
FIG. 6 is a block diagram of a preload application controller of the spindle device shown in FIG. 1A according to an alternative embodiment.

FIG. 6 is a block diagram that shows a preload application controller 5 that is able to protect the spindle. The preload application controller shown in FIG. 6 is similar to that in FIG. 2. The same portions as those in FIG. 2 are denoted by the same reference numerals as those in FIG. 2, and the detailed description thereof will not be provided below. The preload application controller 5 (that corresponds to "preload application control means" according to the invention) is configured by adding a spindle protecting unit 46 (that corresponds to "spindle protecting means" according to the invention) to the configuration of the preload application controller 4 shown in FIG. 2. When a corrected preload amount received from the preload correcting unit 42 is larger than the maximum preload Pmax read from the preload range storage unit 45, the spindle protecting unit 46 gives an abnormality alarm to stop the rotation of the spindle 12 or decrease the number of revolutions of the spindle 12. Because the above spindle protecting unit 46 is provided, the process executed in the preload command value generating unit 43 is changed as follows. That is, when a corrected preload amount received from the preload correcting unit 42 is smaller than the minimum preload Pmin read from the preload range storage unit 45, the preload command value generating unit 43 corrects the corrected preload amount in such a manner that the corrected preload amount falls within a preload range to generate a preload command value.

Note that, in the above embodiment, a preload is controlled to increase as a load acting on the spindle 12 increases and to decrease as a load acting on the spindle 12 decreases. A measure against an increase in load acting on the spindle 12 is taken by increasing a preload amount to increase the stiffness of the spindle 12. Another measure may be taken by changing a combination of the stiffness and damping performance of the spindle 12 instead of just increasing the stiffness of the spindle 12. This is particularly effective specifically when vibration of the spindle 12 or sound generated through machining by the cutting tool T is regarded as change of state of the spindle 12. More specifically, as will be described later, different amounts of preloads are applied respectively to the first and second front rolling bearings 131 and 132 and the rear rolling bearing 133. For example, when vibrations increase as the change of state of the spindle 12, the effect of increasing the stiffness of the spindle 12 by increasing the amount of preload that is applied to the first and second front rolling bearings 131 and 132 and the effect of increasing the damping of the spindle 12 by reducing the preload applied to the rear rolling bearing 133 are appropriately combined with each other.

In addition, in the above described embodiment, the spindle device 1 is configured in such a manner that the pair of first front rolling bearings 131 and the pair of second front rolling bearings 132 are arranged as the bearings that support the front side portion, adjacent to the cutting tool T, of the spindle 12, the rear rolling bearing 133 is arranged as the bearing that supports the rear side portion of the spindle 12, which is behind the front side portion with respect to the cutting tool T, and a preload is applied to the first and second front rolling bearings 131 and 132. Instead, a spindle device may be configured in such a manner that the rear rolling bearing 133 is changed from the cylindrical roller bearing to an angular contact bearing or a taper roller bearing and a hydraulic system, such as a piston, for applying a preload also to the changed rear rolling bearing 133 is provided.

With the thus configured spindle device according to the alternative embodiment, it is possible to separately control a preload applied to the first and second front rolling bearings 131 and 132 and a preload applied to the rear rolling bearing 133. Thus, for example, it is possible to implement control for applying the same preload to both the first and second front rolling bearings 131 and 132 and the rear rolling bearing133, control for applying different preloads to the first and second front rolling bearings 131 and 132 and the rear rolling bearing 133 or control for not applying a preload to one of the first and second front rolling bearings 131 and 132 and the rear rolling bearing 133 but applying a preload only to the other one. Thus, a selectable spindle characteristic range further expands, so it is possible to attain a spindle characteristic further suitable for various types of machining.

In addition, the spindle device 1 is configured in such a manner that the pair of first front rolling bearings 131 and the pair of second front rolling bearings 132 are arranged in front of the built-in motor 14 and the rear rolling bearing 133 is arranged behind the built-in motor 14 to thereby support the spindle 12. However, the spindle device may be configured in such a manner that a pair of front rolling bearings is arranged in front of the built-in motor and a pair of rear rolling bearings is arranged behind the built-in motor to thereby support the spindle. In this case, a pair of taper rolling bearing located in front of the built-in motor is arranged in such a manner that the tapered directions are opposite, and a hydraulic system, such as a piston, for applying a preload is configured as in the case of the above embodiment. A pair of taper rolling bearings, or the like, located behind the built-in motor is also configured similarly. Note that the front and rear rolling bearings may be angular contact bearings as well as those of the above embodiment. However, the rear rolling bearings are desirably taper roller bearings.

With the thus configured spindle device according to the alternative embodiment, it is possible to separately control preloads applied to the front and rear rolling bearings arranged respectively in front of and behind the built-in motor. Thus, for example, it is possible to implement control for applying the same preload to both the front and rear rolling bearings, control for applying different preloads to the front and rear rolling bearings or control for not applying a preload to one of the front and rear rolling bearings but applying a preload only to the other one. Thus, a selectable spindle characteristic range further expands. Therefore, it is possible to attain a spindle characteristic further suitable for various types of machining.

In addition, even in the spindle device that is configured in such a manner that the first and second front rolling bearings 131 and 132 are arranged in front of the built-in motor 14 to support the spindle 12 as in the case of the present embodiment, it is possible to separately control a preload applied to the first front rolling bearings 131 and a preload applied to the second front rolling bearings 132. That is, the pair of first front rolling bearings 131 is arranged in such a manner that the tapered directions are opposite, and a hydraulic system, such as a piston, for applying a preload is configured as in the case of the above embodiment to thereby apply a preload so that the outer rings of the pair of first front rolling bearings 131 are separated from each other. The pair of second front rolling bearings 132, and the like, are also configured similarly. Thus, the functions and advantageous effects similar to those of the spindle device according to the alternative embodiment may be obtained.

What is claimed is:

1. A spindle device that includes a spindle that holds a cutting tool and that is driven for rotation, a rolling bearing that rotatably supports the spindle, and preload application means for applying an axial preload to the rolling bearing, the spindle device comprising:

spindle state measuring means for measuring a change of state of the spindle caused due to machining carried out with use of the cutting tool, the spindle state measuring means including an axial displacement sensor and a radial displacement sensor; and preload application control means for controlling an amount of axial preload that is applied to the rolling bearing by the preload application means in accordance with the change of state of the spindle measured by the spindle state measuring means.

2. The spindle device according to claim 1, wherein the change of state of the spindle is at least one of a change in load applied to the spindle, a change in vibration generated in the spindle and a change in machining sound generated by the cutting tool, and the spindle state measuring means is at least one of a load sensor, a vibration sensor and an acoustic sensor.

3. The spindle device according to claim 1, wherein the preload application control means includes:

preload initial value determining means for determining an initial value of the preload amount on the basis of at least one of the number of revolutions of the spindle, tool information of the cutting tool used, a type of a workpiece machined by the cutting tool and a machining condition; and preload correcting means for correcting the initial value of the preload amount, received from the preload initial value determining means, in accordance with the change of state of the spindle, measured by the spindle state measuring means, to thereby obtain a corrected preload amount.

4. The spindle device according to claim 3, wherein the preload application control means includes:

preload range storage means for storing a range between a maximum preload at which the bearing is able to normally support the spindle and a minimum preload at which the spindle is able to normally rotate as a preset range of preload amount as a controllable region of the preload application means; and preload command value generating means for, when the corrected preload amount received from the preload correcting means exceeds a maximum preload read from the preload range storage means or falls below a minimum preload read from the preload range storage means, correcting the corrected preload amount in such a manner that the corrected preload falls within the range of the preload amount to generate a preload command value.

5. The spindle device according to claim 3, wherein the preload application control means includes:

preload range storage means for storing a range between a maximum preload at which the bearing is able to normally support the spindle and a minimum preload at which the spindle is able to normally rotate as a preset range of preload amount as a controllable region of the preload application means;

preload command value generating means for, when the corrected preload amount received from the preload correcting means falls below a minimum preload read from the preload range storage means, correcting the corrected preload amount in such a manner that the corrected preload amount falls within the range of the preload amount to generate a preload command value; and spindle protecting means for, when the corrected preload amount received from the preload correcting means exceeds a maximum preload read from the preload range storage means, stopping rotation of the spindle or decreasing a rotation speed of the spindle.

6. The spindle device according to claim 4, wherein the preload command value generating means generates the preload command value by multiplying a current preload amount by a preset increase rate or a preset decrease rate, and varies the increase rate and the decrease rate depending on a type of the cutting tool.

7. The spindle device according to claim 4, wherein the maximum preload decreases as a rotation speed of the spindle increases, and the minimum preload increases as the rotation speed of the spindle increases.

8. The spindle device according to claim 1, wherein the rolling bearing includes a front rolling bearing that supports a front side portion, adjacent to the cutting tool, of the spindle and a rear rolling bearing that supports a rear side portion of the spindle, which is behind the front side portion with respect to the cutting tool, and the preload application means applies a preload to at least one of the front rolling bearing and the rear rolling bearing.

9. The spindle device according to claim 1, wherein the rolling bearing includes a front rolling bearing that supports a front side portion, adjacent to the cutting tool, of the spindle and a rear rolling bearing that supports a rear side portion of the spindle, which is behind the front side portion with respect to the cutting tool, and the preload application means applies a preload to both the front rolling bearing and the rear rolling bearing in such a manner that an amount of preload that is applied to the front rolling bearing is different from an amount of preload that is applied to the rear rolling bearing.

10. The spindle device according to claim 1, wherein the roller bearing includes a first pair of front roller bearings and a second pair of front roller bearings, and wherein the first and second pairs of front roller bearings are supported by a bearing support cylinder.

11. The spindle device according to claim 10, wherein the bearing support cylinder includes a cylindrical sleeve and a cylindrical piston laterally adjacent the cylindrical sleeve, the cylindrical sleeve being disposed to cover the first pair of front roller bearings, and the cylindrical piston being disposed to cover the second pair of front roller hearings.

12. The spindle device according to claim 11, wherein an annular hydraulic cylinder is formed between the cylindrical sleeve and the cylindrical piston, the preload application means supplying the hydraulic cylinder with hydraulic pressure to control the axial preload amount.

* * * * *